Sept. 12, 1933.         P. BOUCHEROT ET AL         1,926,191
                  TREATMENT OF QUANTITIES OF WATER
                        Filed Oct. 7, 1927         2 Sheets-Sheet 1
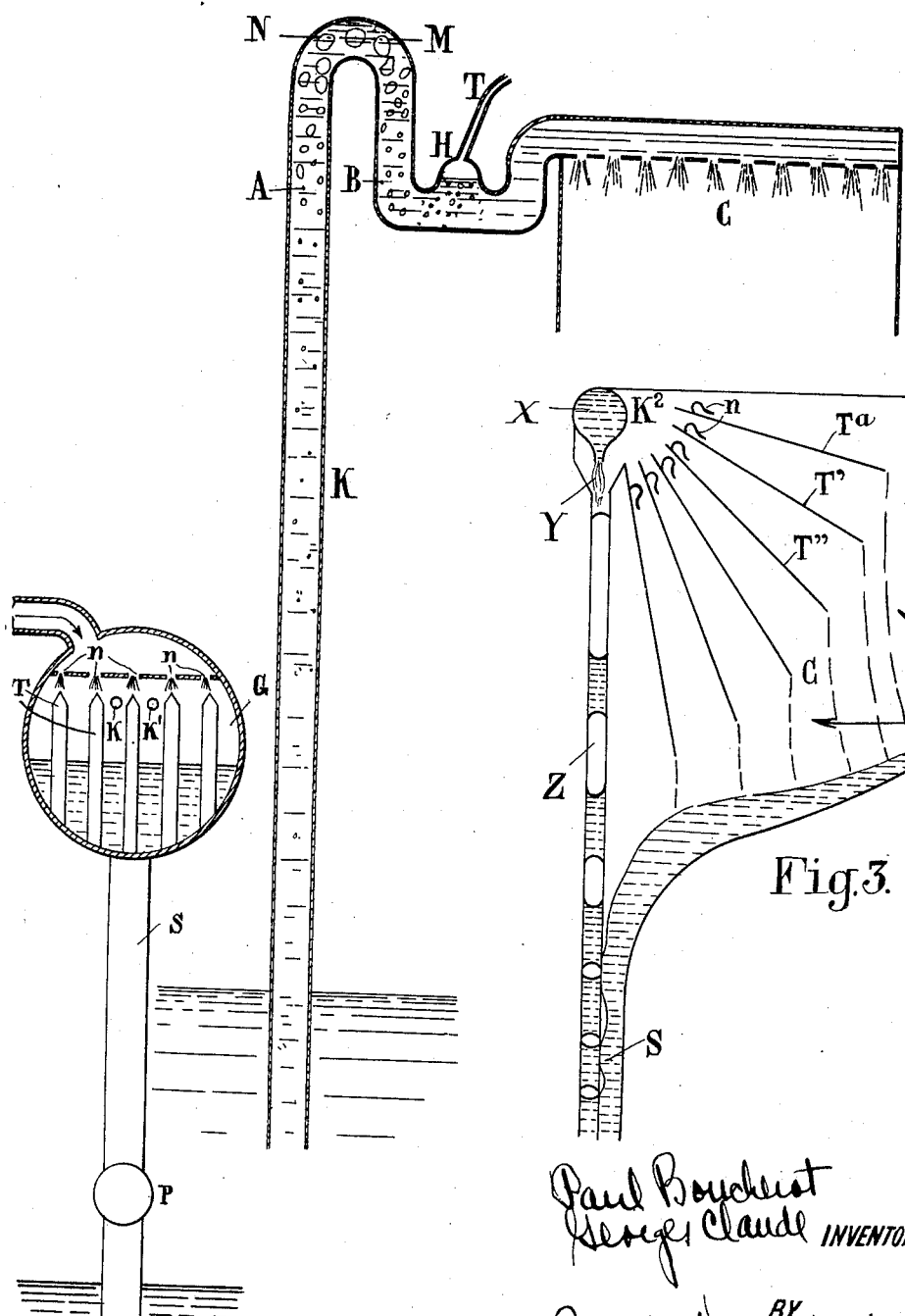

Sept. 12, 1933.                P. BOUCHEROT ET AL                1,926,191
                         TREATMENT OF QUANTITIES OF WATER
                              Filed Oct. 7, 1927        2 Sheets-Sheet 2
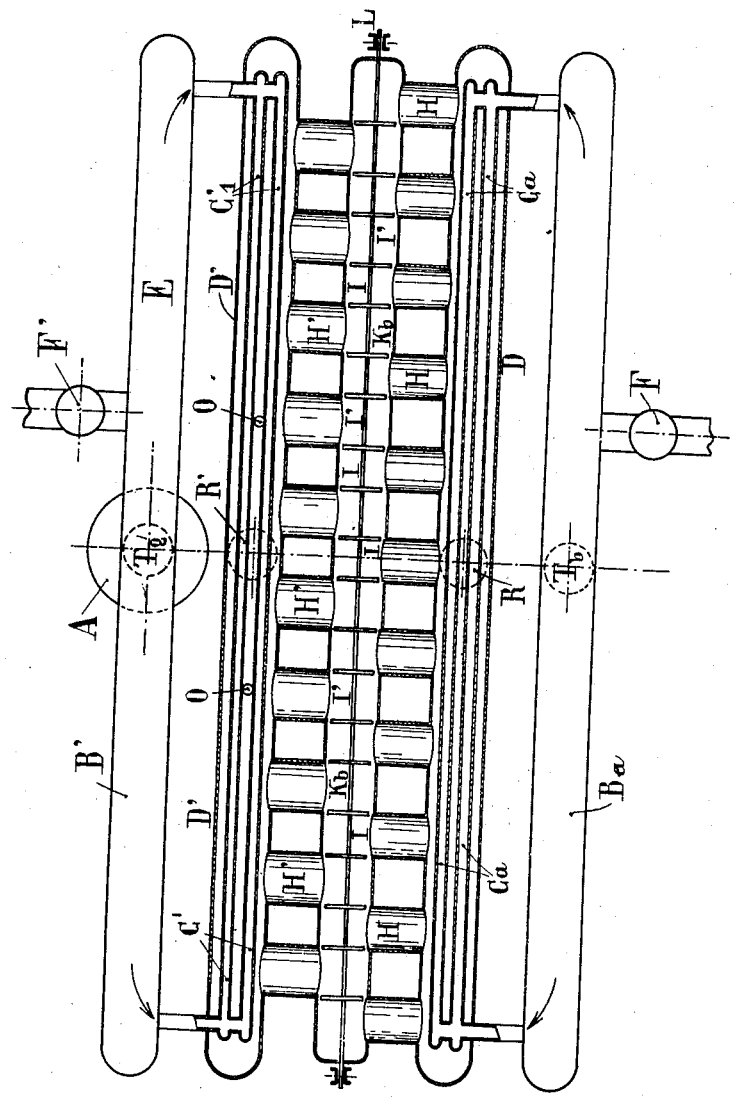

Patented Sept. 12, 1933

1,926,191

UNITED STATES PATENT OFFICE 1,926,191

TREATMENT OF QUANTITIES OF WATER

Paul Boucherot and Georges Claude, Paris, France

Application October 7, 1927, Serial No. 225,406, and in France October 15, 1926

7 Claims. (Cl. 183—2.5)

The present invention relates to improvements in the process described in the patent application of the same inventors, filed in the United States on the 11th March 1927, Ser. No. 174,616, for the utilization, for the purpose of power generation, of practically indefinite quantities of water, the difference of temperature between which is however very slight, and more particularly of quantities of surface water and of deep water of intertropical seas. More generally speaking, it relates to any application utilizing the generation and condensation of steam by means of the said quantities.

One of the essential conditions of the patent application above referred to, consists in the direct use, in turbines, of steam supplied directly by hot water, and condensed directly by cold water, in enclosures with a suitable vacuum.

One of the greatest difficulties in the economical application of the process consists however in the considerable quantity of gases that may be released by the quantities of water during their treatment in enclosures in which a much higher vacuum has to be maintained than those which have been utilized industrially up to now. In other words, due to the exceedingly small pressure differences which are available in a process of the above nature, the liberation of substantial quantities of dissolved gases in the evaporating and/or condensing chambers, would seriously reduce the efficiency of the process. This difficulty is measured by the fact that for each kilowatt-hour produced by the steam, the quantities of gases dissolved are theoretically thousands of times greater than in the existing steam power houses with surface condensers.

The problem of the dissolved gases presents therefore here a hitherto unknown importance, because unless the proper proceeding is adopted, an amount of work would be consumed which when applied to the power, would represent the greatest part of the very small work supplied by the steam at the low pressures in question in this case.

The invention, the chief object of which is to overcome the said difficulty, consists in a combination of means, partly known, which enables this new result to be attained.

The improvements relate to three points:

(1) Preliminary expulsion of the gases or degasification, carried to a greater or less extent, from the quantities of water before their admission into the enclosures where vacuum is to be maintained.

(2) Reduction of the release of the remaining gases in the said enclosures.

(3) Extraction of the gases released in the said enclosures by the cheapest possible means.

In order to make the following explanation as clear as possible, certain important parts of the apparatus used for carrying into practical effect the process forming the subject of the invention, are diagrammatically illustrated by way of example in the accompanying drawings.

Figure 1 relates to one of the methods of degasification which may be used.

Figure 2 relates to a method of effecting the condensation of the steam by the cold water during its passage through the condensing chambers.

Figure 3 shows a device for enabling the gases released to be carried away into the upper portion of the condensing chamber, this carrying away being effected by the action of a water which is colder than the gases to be extracted.

Figure 4 shows a practical construction of devices for the preliminary degasifying, boiling and condensing.

The hot water and the cold water, before their respective admission into the boiling enclosure and into the condensing enclosure, pass through a stage or phase of degasification which may be more or less complete according to the conditions of operation, obtained by known means of degasification, which however are generally employed for an entirely different purpose, that is, for the purpose of avoiding oxidation in the interior of the enclosures containing water or steam.

This degasification is obtained by first utilizing the reduction of pressure during the rising of the water in the barometric columns which conduct it to the boiling and condensing enclosures, and by extracting the gases in one or more collector chambers arranged at suitable levels of the barometric columns; the gases can then be delivered into the atmosphere at a pressure much higher than that in the condensing chamber; in that way the work of expulsion of the fraction of the gases thus extracted, is greatly reduced, all the more because the proportion of steam mixed with the gases and always enormous in the condenser, is at the same time reduced to practically zero.

It has been found however that this release of the dissolved gases during the rise of the water in the barometric columns is far from following the decrease of pressure; it is necessary to assist it by any suitable means. As well known means assisting degasification by pressure and capable of being used successively or simultaneously, the following may be mentioned:

Delivery into the barometric columns or into the chambers interpolated for the purpose, of a very small quantity of water saturated with gas under pressure, or simply of hot water producing in the rising water a number of fine bubbles.

Addition to the water of solid particles, chalk, clay, sawdust etc.

Passage of water rising through a reduction of area which produces cavitation, or through masses of felt or similar substances which have a remarkable effect of accelerating the degasification, or through conduits bent in the form of elbows, half circles, circles, etc. which produce a combined action of the local depression and of the eddying which renews the portions of the water exposed to the local depression. Violent shocks and agitation obtained for instance either by admitting into the water a very small quantity of steam under pressure, or produced by circulating pumps mounted for the purpose near the top of the barometric columns, or by any other mechanical means.

Electrolysis of an infinitesimal portion of the water, which produces the release of myriads of small bubbles of gas, taking care by giving the current a suitable sign or otherwise, to avoid any corrosion of the pipes.

It is possible to utilize also the fact that the boiling of water in a vacuum lower than its vapour tension, is a powerful means of degasification. When water rises in the barometric column K (Figure 1) to the level of complete vacuum, a small quantity of this water will energetically boil therein at MN; the steam carrying away the dissolved gases into the swan neck MB, will be condensed again by re-compression at B, but only a very small portion of the gases will again become dissolved; the rest of these gases collected at H, can be extracted through T (as per example by a vacuum pump not shown) from this lower level where there is already a considerable absolute pressure, owing to which the work of extraction will be reduced; the extraction of the gases will also be assisted in the portion MN by the depression near the centre of the bend, due to the change of direction. With suitable precautions, the work of rising in the portion AN of the barometric column will be practically recovered in the portion MB. The liquid freed from the gases can then be conveyed into the chamber C in which it is utilized.

This method of utilization of the reversibility of the phenomenon of evaporation, and of the nonreversibility of the gas expulsion or degasification is given merely by way of example.

Whatever be the means employed, this preliminary degasification will always be merely a partial one, even with sea water. But this very difficulty of obtaining it, has an important consequence, namely that the partly degasified water which passes into the boiling or condensing enclosures, strongly retains the rest of its gases, so that the extraction of the dissolved gases from the condensing chamber is reduced to a very small fraction of what may have been feared.

It has been found that this tendency of partly degasified water to keep the rest of its gases, can be still further assisted. It has been found for instance that, contrary to what has been done up to now, a very satisfactory condensation can be obtained by avoiding as far as possible any atomizing and even any energetic agitation of the cold water during its passage through the condensing chamber. To that end, it could be made to flow in thin sheets or layers, preferably by trickling or overflowing on surfaces, the friction of which causes a continual rearrangement of molecules in the water, thus renewing or replacing the superficial molecules of the surface of the sheet and affects the whole of the latter during the condensation, by preventing a strong heating of a thin outer film which has not been renewed, from becoming heated on account of the bad heat conductivity, and from greatly reducing the possible vacuum in the condenser. In these conditions the water of condensation gives off very little of the gases which it retained.

Figure 2 shows an example for carrying out the said process: the degasified water passes through the orifices $n, n, n$: into the condensing chamber G under the action of the excess of its own barometric pressure over the pressure in this chamber, trickles in thin layers or sheets on cylindrical rods T, T, T . . . or other surfaces vertically arranged below the holes $n$. This water in condensing the steam which is understood to enter the chamber G through a vapor inlet not shown, becomes gradually heated during its descent along the rods to the liquid level, but as the whole of it is affected, this heating is a minimum, as well as the pressure in the condenser. The water circulation is regulated so that this heating of the water during its trickling, should not exceed a few degrees. The water is discharged under the surface of the sea after use, through the descending barometric column S by means of a pump P. The gases are extracted by a vacuum pump not shown from the condensing chamber through branches K', preferably near the top of the rods T, T . . ., that is to say near the admission of the water of condensation, in the coldest region, so as to reduce to a minimum the enormous proportion of steam which is carried away at the same time.

It has been also found, more particularly when pushing the degasification of the hot water very far, that with the same process it is even possible to avoid to a considerable extent any release of any of the gases remaining in the boiling chamber. In fact, the quiet flow of this highly degasified hot water free from any gas bubbles, through inlet orifices and over surfaces similar to those of Figure 2, may have for its result, if the film of water on these surfaces is very thin and if the cooling to which the hot water is submitted, is very slight, that there will be no proper boiling, but only a superficial vaporization without any perceptible release of the rest of the dissolved gases.

In order to increase the utilization of the cold water and thus to reduce the relative proportion of dissolved gases while retaining a good efficiency of the heat engine, two turbines or sets of turbines working with the same initial steam pressure, but with different tensions in the condensers could be used; the first one having a tension corresponding to the cold water, and the second one having a tension corresponding to the cold water already slightly heated by its first utilization.

The proceeding may be the same as regards the hot water, each water could be utilized even three or four times, and the two processes could also be combined, the turbine driven by the hottest steam exhausing into the least cold condenser, and conversely.

The dissolved gases released during the boiling or the condensation, are extracted at several points of the condensing chamber, as already stated by withdrawing them near the level of admission of the cold water jets, and taking at the same time all the usual precautions as regards isothermic action of the compression, clearances etc., these precautions being of great importance in this case on account of the enormous proportion of steam to be liquefied at the beginning of the compression. The extraction apparatus, such as reciprocating compressors, turbines running in reverse direction, centrifugal pumps or others, preferably compresses these gases to the pressure of those which the other compressors extract from the degasifying chambers arranged along the rising barometric columns, so that the same apparatus completes the compression to the atmospheric pressure.

The extraction of the gases from the condensing chamber may also be effected by carrying them away by means of any water, more particularly by means of the very water used for the condensation, wholly or in part. It will be readily understood in fact that the water which has been already used for the condensation, on rushing into the barometric discharge column at the lower portion of the chamber, can be utilized for mechanically carrying away the gases which collect in the lower portion on account of their greater density. It seems however advisable to complete this extraction from below by another effected at the top, with colder water.

Figure 3 shows an example for carrying this idea into practical effect. As in Figure 2, $T^a$, $T'$, $T''$ . . . are the supports for sheets of water used for condensation which are here flat instead of being cylindrical, the steam arriving through chamber A' from the turbine; $n, n, n$ . . are the openings for cold condensation water which are preferably formed in transverse pipes close to the plates T and will ordinarily be supplied with cold degasified water from a common header which may be connected to the same source of supply as the pipe X, and S the barometric column for the discharge of this water. The gases released by the condensation water during its descent along the planes $T^a$, $T'$, $T''$ . . . and those released by the hot water during the generation of steam and arriving with the latter through A', collect for the most part in the space $K^2$. From the latter which has a recessed or reduced portion Y, starts a down pipe Z which at its lower portion is in communication with the atmospheric pressure, and in which flows abundantly water coming from a water supply pipe X arranged at the top. This water can be of the same origin as that escaping through the orifices $n, n$ . . . for the condensation, that is to say it could come from the source of cold water; but as it is fairly expensive to obtain, it seems preferable, after having utilized it for this extraction of the gases, to utilize it subsequently for the condensation, as it will have been heated by the condensation of the steam mixed with the gases and by the compression of the latter, only to a negligible extent. The water will thus carry away the gases by a kind of pump action which may be with continuous flow or with intermittent flow as shown in the figure but during the time that it is thus serving will not dissolve any great amount of gas. The latter method seems preferable in view of the great volume of gases to be extracted and can be obtained by means of any desired mechanism, the details of which it would be needless to describe here.

The extraction assumed here to have been effected at the top, could be effected at any other level, and this process of extraction could be moreover applied also to the gases withdrawn either from the hot water or from the cold water before the admission of either water into the vaporization chamber or condensation chamber, always taking care to use for the purpose in the pumps or tromps water colder than the gas to be extracted.

An example for carrying into practical effect the above characteristic principles of preliminary degasification, boiling and condensation, which is very convenient but not limitative, is shown in a very diagrammatic manner in Figure 4. The hot water is taken from the surface of the sea by means of the barometric tube $T^b$; the cold water is taken in the same way through a tube T2 from a tank A in the open air, into the bottom of which opens a tunnel connected to the pipe which can be examined, bringing cold water from a great depth. This arrangement makes possible free release at the atmospheric pressure of the excess of the dissolved gases that the deep water may contain. It avoids or reduces at the same time any disturbances which variations of speed of the turbines or movements of the platform could produce if the submarine pipe were connected direct to the condensing chambers.

The pipes $T^b$ and T2, barometric columns of suitable heights, provided if necessary with regulating pumps, terminate respectively at two horizontal tubular conduits $B^a$, B' built to resist the vacuum, in which the water circulates from the centre towards the ends and becomes degasified, for instance under the action of its agitation or of some other means such as electrolysis. In the latter case, a conductor which may be located at the point designated "E", and which is not easily corroded and can be easily replaced, constitutes the anode, and the pipe itself constitutes the cathode. The length and the diameter of the pipes $B^a$ and B' and the speed of water are such that, under the action of the means employed, the degasification of the water will become sufficient when the water reaches the ends of $B^a$ and B'. The gases released under the considerable pressure obtaining in $B^a$ and B' (for instance 0.15 atmosphere) are delivered into the atmosphere by the pumps F and F'. Thence the hot water and the cold water already partly degasified pass reciprocally into the relatively small pipes $C^a$, C1 arranged in the interior and at the top of two other pipes D and D' of much larger size extending parallel to $B^a$ and B' and constituting respectively the boiling and the condensing chambers.

The pipes Ca, C1 are provided throughout the whole of their lower surface, with orifices through which the water flows in jets which spread over surfaces or rods T and T1 not shown in the figure, and produce either vaporization at D which is supposed to be a nonviolent vaporization (the hot water being assumed to have been already greatly degasified previously, for instance owing to a higher level of the chamber B and a greater agitation of this chamber, so as not to be atomized at its admission into D) or the condensation at D'.

It is also possible by arranging the pipes

C', Ca near the bottom of D and D', to replace the plates such as Ta, T' (Fig. 3), by tubes or overflow devices fed from the bottom and overflowing at the top, which in spite of an incomplete methodicity, has the great advantage of leaving the top of the pipes D D' entirely free from the circulation and withdrawal of the steam. In these pipes or other overflow devices losses of head may be produced in order to render uniform the flow throughout the whole length of the pipes.

The water trickling down all the rods or escaping from the tubes or overflow devices and collecting at the bottom of each pipe, flows owing to a slight slope of the latter, towards a barometric descent column R or R' arranged in the centre of the pipe, in which a pump (not shown) makes up for the losses of head. The water utilized, more particularly the cold water, is discharged below the surface of the sea so as not to disturb the temperature of the surface water.

Throughout the whole of their length, the tubular boiling and condensing chambers D D' are connected, by means of very wide and very short branches H H' to the admission chambers I and to the exhaust I' of the elements of turbines Kb arranged in series on a common shaft L. Steam being thus generated, utilized and condensed on a very short path of large cross section, the losses of head are of small importance.

If an economic source of heat were available, and if it were not desired to benefit by the advantages of partial condensation of steam in the turbine, the steam could be superheated on its way to the turbine. It goes without saying that precautions must be taken to reduce to a minimum wherever necessary, or to make remediable any corrosion by sea water as well as deposits of any kind. Compensating pumps could be used for compensating variations of barometric pressure or of the tide.

The dissolved gases released during the boiling or the condensation are extracted at several points of the condensing chamber D, with the precautions and by the means hereinbefore indicated, and are preferably compressed to the pressure of those which the pumps F and F' extract from the degasifying chambers B and B', then added to the latter in order to be also compressed to the atmospheric pressure by the pumps F and F'.

Having now particularly described and ascertained the nature of our invention and in what manner the same is to be performed, we declare that what we claim is:—

1. The method of utilizing in low pressure power generators, water at temperatures and pressures within the general atmospheric range, which comprises the steps of causing the water to rise in a barometric tube connected at its upper end to a low pressure chamber, so that the pressure on the water is reduced to substantially below atmospheric, causing bubbles to form in such water to serve as nuclei for dissolved gases, whereby gases are caused to come out of solution and separate from the water, removing liberated gases from the water to prevent such gases from building up a substantial pressure, causing water from which gases have been removed to flow in films through a space at very low pressure, collecting water from such flow, and removing it against pressure of the atmosphere, and causing water from which dissolved gases have been removed as above set forth to flow through a portion of said space and out through a barometric tube so as to entrain and remove from such space gases liberated from solution.

2. The method of degasifying water, which comprises the steps of lifting water in a barometric column to approximately the vacuum point so that the water is caused to boil, causing the water while in a closed system to flow below such point into a chamber, withdrawing gases from such chamber, again causing the water to rise by suction after leaving such chamber and removing gases released after such second rise by the pump action of falling masses of such water.

3. The method of degasifying water, which comprises the steps of lifting the water in a barometric column to approximately the vacuum point, causing the water while in a closed system to fall below such point and enter and pass through a lower zone still at pressures very substantially below atmospheric, withdrawing from such lower zone gases which have been liberated from solution and then causing the water to rise above such lower zone and enter a chamber maintained at a pressure low enough to cause the water to flow through said barometric tube.

4. A method as set forth in claim 3, which further comprises the step of subjecting the water to agitation while at the pressure approximating the vacuum point in order to induce the separation of dissolved gases.

5. The method of degasifying water which comprises the steps of applying continuous suction to cause water to rise in a tube until the pressure is very materially below atmospheric and then causing such water to drop to a lowered level and to rise again to a level above said lowered level, entrapping released gases over the water at such lower level and removing the same.

6. The method of degasifying water which comprises the steps of raising water in a conduit by suction whereby the pressure is progressively reduced, treating the water during its passage through such conduit to stimulate the formation of gas bubbles, collecting gas of such bubbles and withdrawing same and thereafter introducing the water from which such gas has been withdrawn into a chamber maintained at a lower pressure than the pressure at which such gas was removed and at a pressure approximating the vapor tension of such water.

7. The method of degasifying water, which comprises the steps of raising water in a conduit by suction whereby the pressure on the water is progressively reduced, inducing the formation of gas bubbles in the water by means supplementary to the reduction in pressure, collecting gas of such bubbles and withdrawing same, and thereafter introducing the water from which such gas has been removed into a chamber maintained at a pressure substantially lower than the pressure at which such gas was removed.

PAUL BOUCHEROT.
GEORGES CLAUDE.